United States Patent [19]
Talvitie et al.

[11] Patent Number: 6,133,884
[45] Date of Patent: *Oct. 17, 2000

[54] COMMUNICATION UNIT, AN ANTENNA AND A METHOD FOR CONNECTING AN ANTENNA

[75] Inventors: Olli Talvitie, Tampere; Olli-Pekka Lunden, Suinula; Timo Laitinen, Viiala, all of Finland

[73] Assignee: Nokia Mobile Phones Ltd., Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 09/021,544

[22] Filed: Feb. 10, 1998

[30] Foreign Application Priority Data

Feb. 14, 1997 [FI] Finland ..................... 970618

[51] Int. Cl.[7] ..................................................... H01Q 1/24
[52] U.S. Cl. ........................... 343/702; 343/904; 343/906
[58] Field of Search ...................... 343/702, 711, 343/713, 715, 906, 904; 439/916; H01Q 1/24

[56] References Cited

U.S. PATENT DOCUMENTS

| | | | |
|---|---|---|---|
| 3,969,728 | 7/1976 | Hodsdon et al. | 343/702 |
| 5,551,080 | 8/1996 | Chambers et al. | 455/348 |
| 5,757,332 | 5/1998 | Hanaoka et al. | 343/787 |
| 5,777,585 | 7/1998 | Tsuda et al. | 343/702 |
| 5,812,094 | 9/1998 | Maldonado | 343/702 |
| 5,822,705 | 10/1998 | Lehtola | 455/575 |
| 5,861,851 | 1/1999 | Chang | 343/702 |
| 5,870,279 | 2/1999 | Mahany et al. | 361/679 |

FOREIGN PATENT DOCUMENTS

| | | |
|---|---|---|
| 0 407 145 A1 | 1/1991 | European Pat. Off. . |
| 0 610 025 A1 | 8/1994 | European Pat. Off. . |
| 2 270 599 | 3/1994 | United Kingdom . |
| WO 96/27916 | 9/1996 | WIPO . |

*Primary Examiner*—Don Wong
*Assistant Examiner*—Shih-Chao Chen
*Attorney, Agent, or Firm*—Perman & Green, LLP

[57] ABSTRACT

The present invention relates to a communication unit (50, 58) comprising a radio module (50, 58) and an antenna (30, 40) to be coupled thereto. The communication unit (50,58) and the antenna (30, 40) are connected together by a first pair of contacts (33, 43, 51, 55) across which an antenna signal can be transmitted. In addition, the communication unit (50,58) is equipped with a second pair of contacts (35, 52) across which ground potential can be provided by the communication unit (50, 58) to the antenna (30, 40) or to an antenna cable shield. The second pair of contacts (35, 52) are at a distance from the first pair of contacts (33, 43, 51, 55). The contacts may comprise pins, plugs, sockets or any other suitable contacts. The communication unit enables a durable and reliable antenna solution to be implemented, e.g., within a PCM/CIA data card (50, 58).

16 Claims, 6 Drawing Sheets

COMMUNICATION UNIT, AN ANTENNA AND A METHOD FOR CONNECTING AN ANTENNA

FIELD OF THE INVENTION

The present invention relates to a communication unit and antennae used in connection with it. In particular, the invention relates to an antenna connection used in connection with a radio module implemented within a PCMCIA data card. Both a separate external antenna and a fixed antenna can be coupled to the antenna connection according to the present invention.

BACKGROUND OF THE INVENTION

When the first transferable mobile phones, weighing several kilograms each, entered into the market, they had two basic uses. The transferable mobile phones were used either fixed to the vehicle and normally equipped with an external vehicle antenna attached to the vehicle's roof or they were used outside the vehicle by means of a so-called whip antenna attached to the mobile phone. The antenna connection was implemented by means of a coaxial connector often by using a BNC or Baby "N" Connector, known to persons skilled in the art. Coaxial connections to mobile phone antennae are described e.g. in patent publications EP 407 145, WO 96/27916 and U.S. Pat. No. 5,551,080. In a vehicle installation, the antenna connection from the mobile phone, e.g., to the vehicle's roof antenna was implemented by means of a coaxial cable according to FIG. 1A. When it was necessary to use the transferable mobile phone outside the vehicle, the cable running to the roof antenna was unscrewed and a whip antenna was installed in its place as shown in FIG. 1B. These systems are still commonly used. It is true that this kind of antenna solution, based on the use of coaxial connectors, functions well in this environment. Transferable mobile phones' big size and, at the time, high price did not prevent, e.g., the use of big and expensive Baby "N" Connectors. FIGS. 1A and 1B will be described later in more detail.

The transferable mobile phones were so heavy that they were not detached from the car and re-installed on a daily basis. Thus, it was not necessary to detach and attach the troublesome antenna connector very often. However, the situation changed completely when light, pocket-size mobile phones started to become more common. People began to carry their mobile phones with them and, therefore, there was no sense in screwing an antenna connector in place, when getting in the car, and then unscrewing it again, when getting off the car. On the other hand, a big BNC-type coaxial connector would no longer have fitted in the small mobile phone anyway. Neither would it have been sensible for economic reasons.

A solution that is still being used was found for the problem presented above. Normally, a fixed whip antenna is used in portable mobile phones. When a mobile phone is attached, e.g., to a vehicle, this is done through a separate installation mount. In this case, the fixed antenna switches off and an external vehicle antenna switches on, typically, by means of a separate antenna connector, installed on the mobile phone's bottom, and a counterpart, fixed to the installation mount, as shown in FIG. 2. An antenna selector is responsible for switching between the antennas. This system operates well in practice, because the mobile phone can be easily detached from and attached to the installation mount, and the antenna is selected automatically. The system's drawbacks are a connection loss in the antenna selector, as well as the use of a small coaxial connector the manufacturing costs of which are high, in connection with an external antenna. In addition, high manufacturing accuracy is required of the installation mount, because the small coaxial connector should go exactly in the right place, when the mobile phone is attached to its installation mount. In addition, the small coaxial connectors are sensitive to dirt, wearing and they are also easily broken. The solution also presupposes additional components, such as an antenna selector. FIG. 2 will be described later in more detail. The systems presented above are applicable to their own special uses. Now that the integration of electronics has developed further, it has become possible to further reduce the size of telecommunications terminals and mobile stations utilising radio communication. Radio modules or mobile stations, coupled to portable computers, by means of which a portable computer can be connected to telecommunications networks wirelessly using radio communication, are becoming an important application. A radio module is coupled to a portable computer through a data bus, e.g., a PCMCIA (Personal Computer Memory Card International Association) bus, which is currently the most commonly used bus. It is possible to install, in the PCMCIA bus, a PCMCIA card about the size of a credit card, whereon the electronic components required by the radio module can be installed. However, the PCMCIA card's small physical measurements set strict limits to the components to be used in connection with the PCMCIA card. The implementation of an antenna has proved extremely problematic, because it has been impossible to implement a small and reliable antenna connection. In addition, solutions based, e.g., on small coaxial connectors are expensive to implement due to the accuracy required of the fine-mechanical parts and they also break easily. Due to the measurements, the centre pin of a small coaxial connector remains thin and weak. Therefore, this type of connector is not suitable for use in very small radio modules, e.g., the size of a data card, wherein the antenna must often be turned from one position to another. A thin and weak centre pin wears and does not guarantee reliable contact for an antenna signal.

In Patent Publication EP 0 610 025 A1, a solution has been presented, wherein a PCMCIA card modem has been implemented, the card modem consisting of two or more modules, substantially the size of a PCMCIA card, which have been articulated with one another. The antenna used has been integrated on the surface of a circuit board within a module located outside a computer. The solution used requires a complex mechanical structure between the different modules and is unsuitable for small radio modules the size of only one PCMCIA card. In addition, the implementation of an antenna within the same module on the same circuit board as the rest of the electronics causes a problem in the form of radio interference and the deterioration of the antenna's radiation properties. In addition, an arrangement according to said publication does not enable a separate external antenna to be coupled in connection with a data card.

SHORT SUMMARY OF THE INVENTION

Now, a solution has been found for an antenna particularly suitable in connection with a PCMCIA card to prevent problems presented above. In an antenna solution according to the invention, the contacts are not made in a coaxial manner, but by two opposed contact pins, whereby an antenna signal is transmitted between a radio module and an antenna using a first contact pin and the radio module's ground potential required in connection with an external antenna, in particular, is transmitted to the external antenna using a second contact pin, where the second contact pin is at a distance from the first contact pin so that the first and second contact pins form two opposed contact pins.

In an antenna system according to the present invention, it is possible to couple an antenna module resembling a fixed antenna, e.g., to a PCMCIA data card by means of a durable and small antenna connection consisting of two separate connections, which, when turned in the direction of the card, integrates as part of the PCMCIA card. When the antenna module is turned to an upright position, the antenna module will produce an even better radiation pattern than before. When using, in poor field conditions, a PCMCIA radio module or a PCMCIA mobile station equipped with an antenna solution according to the present invention, the antenna module can be replaced with an external antenna. The external antenna is preferably installed, by means of a cable, in the same antenna connection as the antenna module mentioned above. The centre conductor of the antenna cable coming from the external antenna is coupled to the same first connection as the antenna module, but the ground conductor required in connection with the external antenna (e.g., a coaxial cable shield) is coupled to a separate ground connector (a second connector) according to the present invention. Thus, the size of the connector used for the external antenna's centre conductor (as also for the above-mentioned antenna module) is only restricted by the physical measurements of the data card. Because it is not preferably necessary to use a coaxial connector type, it is possible to implement, by means of the present invention, a durable antenna connection having a large area and providing a good contact, in a small space.

According to a first aspect of the invention there is provided a communication unit comprising a radio module, antenna connecting means for connecting an antenna to said radio module, said antenna connecting means comprising a first contact pin for transmitting an antenna signal between said radio and said antenna, the communication unit being characterised in that said antenna connecting means comprise a second contact pin for providing a ground potential of the radio module to said antenna, said second contact pin is at a distance from said first contact pin so that the first and second contact pin form two opposed contact pins.

According to a second aspect of the invention there is provided an antenna comprising antenna connecting means for connecting the antenna to a transceiver unit, said antenna connecting means comprising a first contact pin for connecting an antenna signal between the antenna and said transceiver unit, the antenna being characterised in that said antenna connecting means comprise a second contact pin for providing a ground potential of said transceiver unit to said antenna, said second contact pin is at a distance from said first contact pin so that the first and second contact pin form two opposed contact pins.

According to a third aspect of the invention there is provided a method for connecting an antenna to a communication unit, wherein an antenna signal is connected between said antenna and said communication unit using a first contact pin, the method being characterised in that, in addition, a ground potential of the communication unit is provided to said antenna using a second contact pin, and placing said second contact pin at a distance from said first contact pin so that the first and second contact pin form two opposed contact pins.

DETAILED DESCRIPTION OF THE INVENTION

Figure 1A:
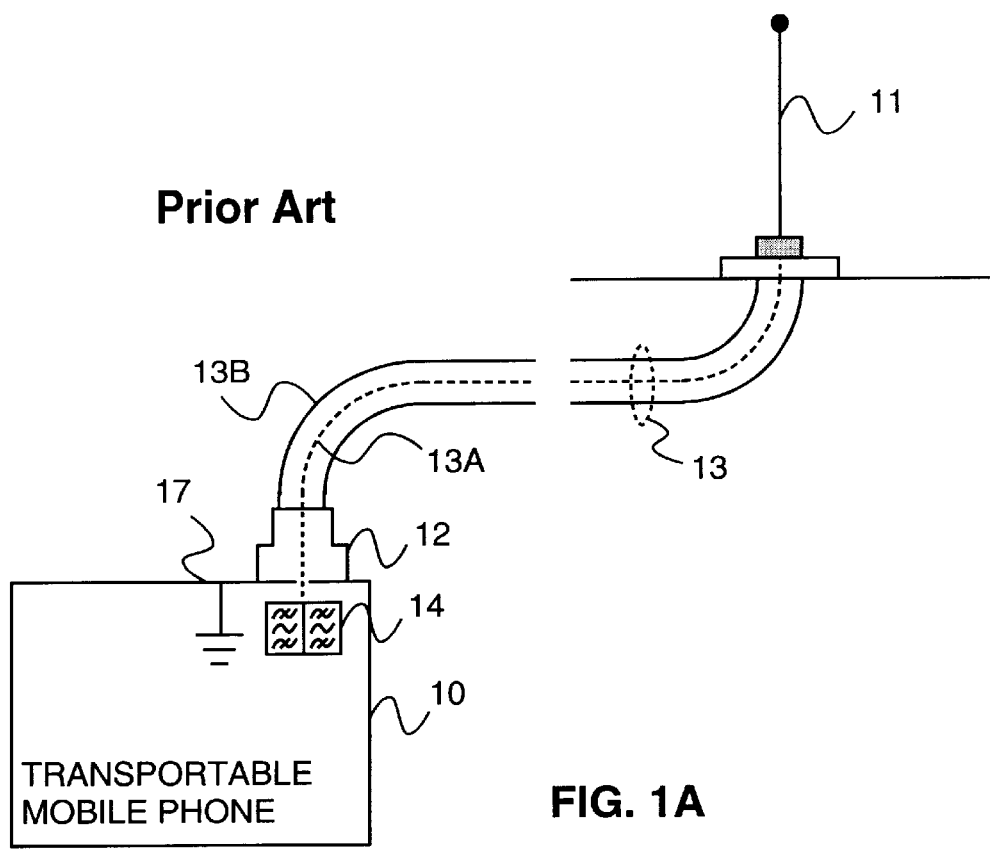
FIG. 1A shows a well-known external antenna connection used in transferable mobile phones.

FIG. 1A shows an exemplary system according to prior art for coupling an external antenna 11 to a transferable mobile phone 10. It has been implemented by means of a coaxial cable 13 and a coaxial BNC connector 12. An antenna signal 13A is transmitted to the external antenna 11 (indicated by a dashed line) using the coaxial cable 13 and the centre conductor of the BNC connector 12. The antenna signal is transmitted, e.g., from a duplex filter 14, but the duplex filter 14 can also be replaced, e.g., with an electric switch. To eliminate electromagnetic interference a shield 13B of the antenna cable 13 is typically grounded to the frame of the mobile phone 10 having a specific ground potential 17. Certain external antennas 11 also presuppose the transmission of the mobile phone's ground potential 17 to the external antenna 11. The ground potential 17, required by the external antenna 11 or the shield 13B of the antenna cable 13, is coupled using the electric contact provided by the outer circumference of the coaxial BNC 12.

Figure 1B:
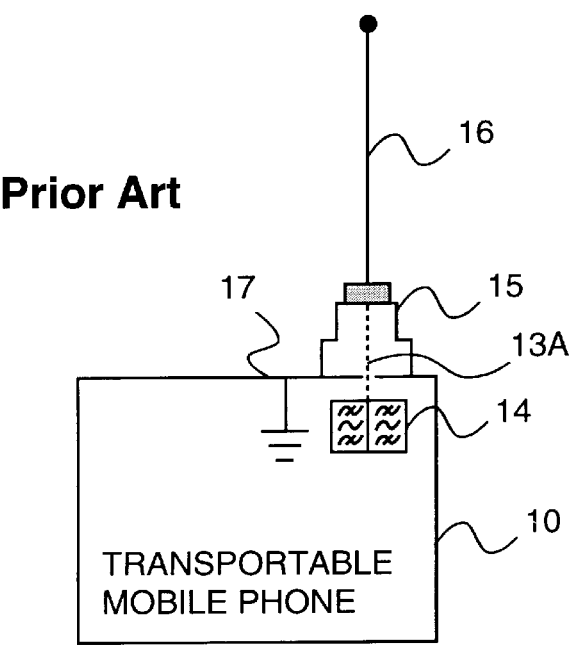
FIG. 1B shows a well-known fixed antenna solution used in connection with transferable mobile phones.

FIG. 1B shows an arrangement wherein, instead of the external antenna 11, a fixed whip antenna 16 has been installed in the same transferable mobile phone 10. The antenna has been fixed by means of an insulated BNC 15. The antenna signal 13A is transmitted along the centre conductor of the BNC 15 from the duplex filter 14 to the whip antenna 16, whereas there is no need to establish the separate ground potential 17 from the mobile phone 10 to the whip antenna 16. The frame of the mobile phone 10 acts as the ground potential against which the whip antenna 16 radiates. The insulated BNC 15 and the fixing mechanism of its external circumference (not shown in the figure) have only been used for mechanically fixing the whip antenna 16.

Figure 2:
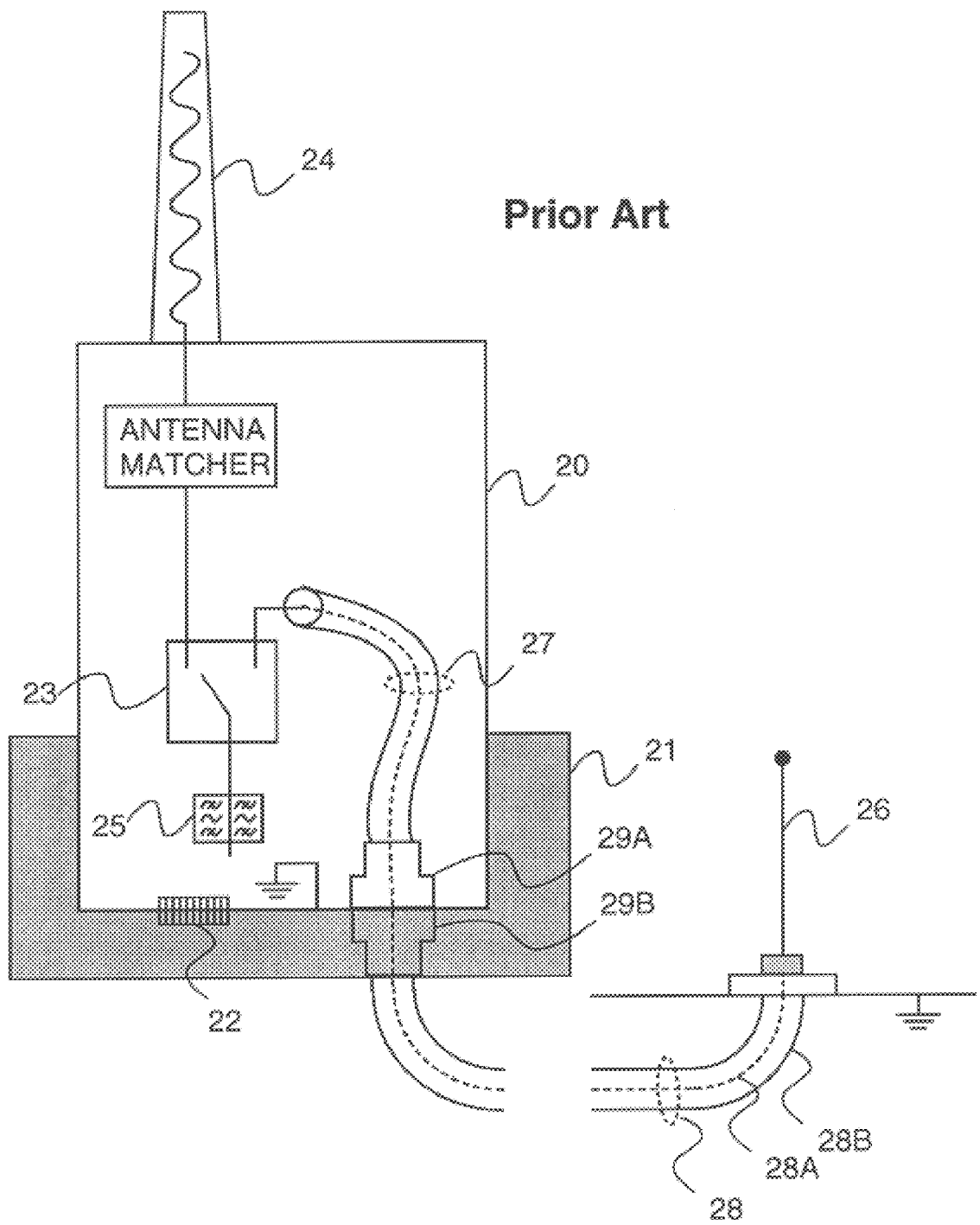
FIG. 2 shows a well-known two-antenna solution used in connection with portable mobile phones, wherein the used antenna is selected by means of an antenna switch.

FIG. 2 shows a well-known arrangement, wherein a portable mobile phone 20 has been fixed to an installation rack 21. The mobile phone 20 observes being fixed to the installation rack 21, e.g., by means of a connection strip 22, whereupon an antenna switch 23 switches off a fixed antenna 24 of the mobile phone 20. At the same time, the antenna switch 23 switches an antenna signal 28A (indicated by a dashed line) from a duplex filter 25 to an external antenna 26 in the centre conductor of coaxial cables 27 and 28. A small coaxial connector 29A, fixed to the mobile phone, and a coaxial connector 29B, fixed to the installation rack, are used as connectors. A ground contact from the mobile phone 20 for the external antenna 26 is produced as described in connection with the legend of FIG. 1A using a shield 28B of the coaxial cable 28.

Figure 3:
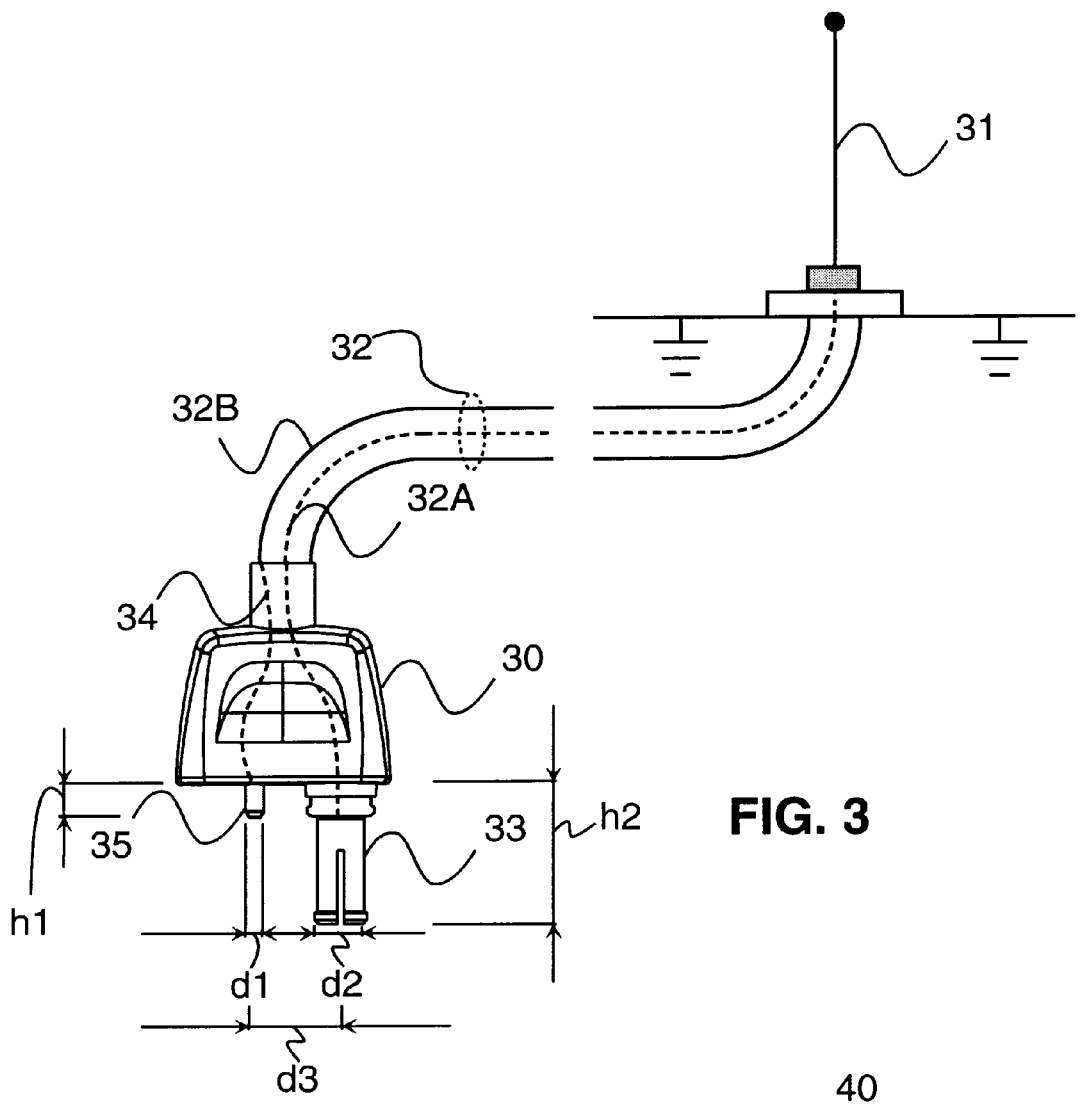
FIG. 3 shows an external antenna coupling carried out by means of an antenna connection according to the present invention.

FIG. 3 shows the implementation of an antenna connection and the electric coupling of antenna signals 32A and 32B according to the present invention using an external antenna 31. The antenna conductor 32A (centre conductor of coaxial cable) from the external antenna 31 has been coupled to an antenna plug 33 of an antenna connector 30. In the antenna connection according to the present invention, it is possible to implement the antenna plug 33 by means of a simple antenna plug 33 (the third contact) providing a single electric contact, which is extremely robust and reliable. The fine-mechanical parts required by the coaxial connectors 29A and 29B (FIG. 2) (e.g., a separate centre pin and its counterpart) are not required, because a ground contact 35, required in connection with the external antenna 31, has preferably been implemented by means of a separate ground plug 35 (the fourth contact) according to the invention, the ground plug 35 being at a distance from the antenna plug 33 so that the ground plug and the antenna plug form two opposed plugs or contacts. The dimensions of the connector 30 and the contacts may be for example the following: diameter d1 of the ground plug 35 is 1.2 mm, height h1 of the ground plug 35 is 3.3 mm, diameter d2 of the antenna plug 33 is 6.0 mm, height h2 of the antenna plug 33 is 12.1 mm, and the distance d3 between the centres of the ground plug 35 and the antenna plug 33 is 8.0 mm. The dimensions of the ground plug 35 and the antenna plug 33 as well as the distance between them easily affects the quality of the rf signal transmitted via the connector and these factors might cause disturbances in the signal. For example, the above mentioned dimensions are too big for the antenna plug 33, and a better result can be achieved by reducing its size to one fourth, e.g. d2=1.5 mm and h2=3.0 mm, i.e. to about the same size as the ground plug 35. Also disturbances in the radio signal can be reduced by shortening the distance d3 to for example 5.0 mm or 6.0 mm.

Figure 4:
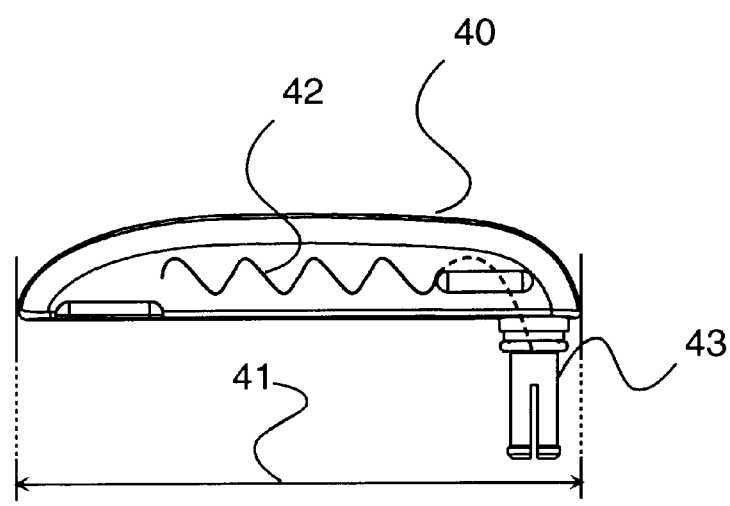
FIG. 4 shows an antenna module implemented by means of an antenna connection according to the present invention.
Figure 5:
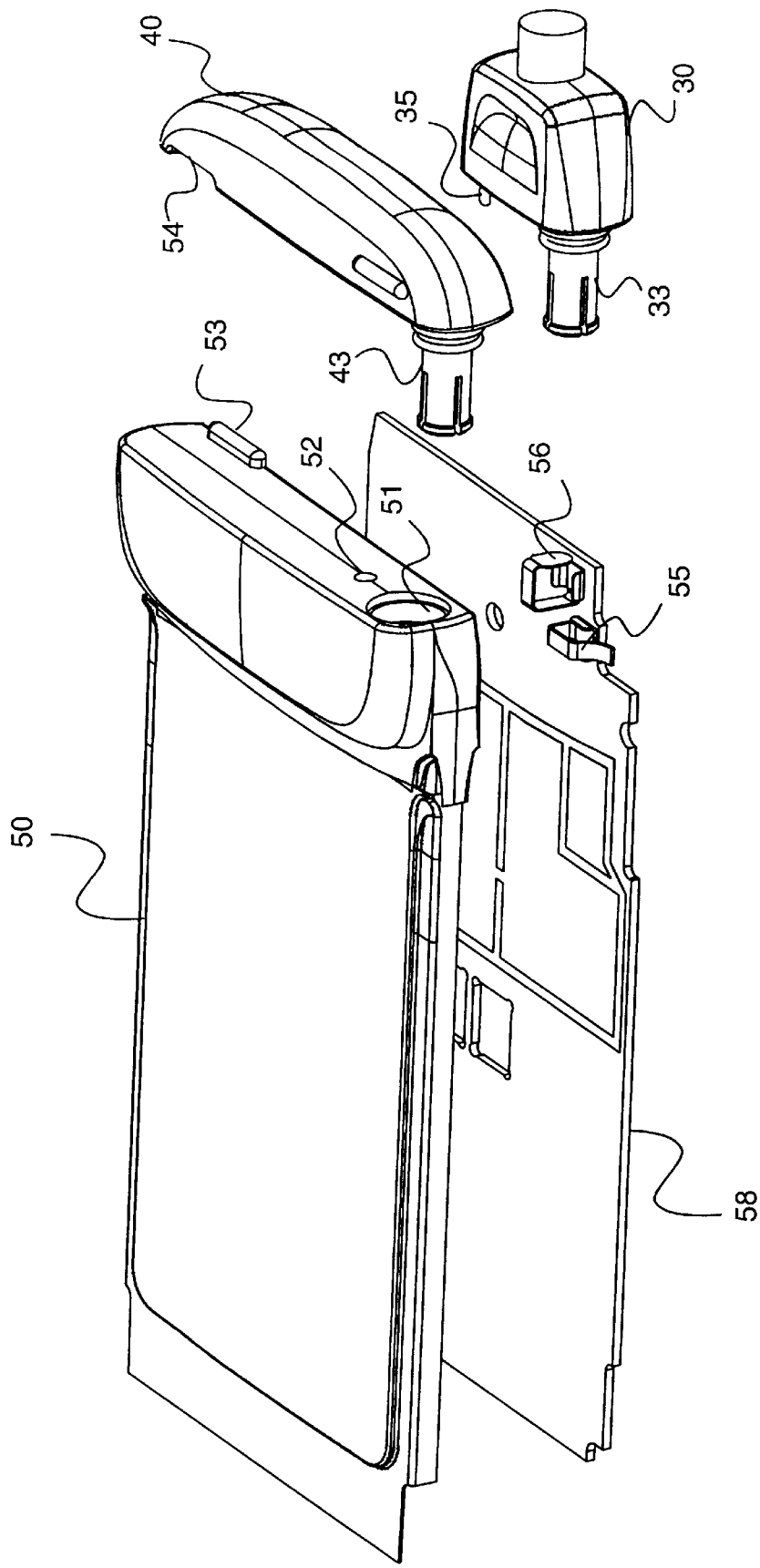
FIG. 5 shows a PCMCIA card according to the present invention and an antenna module and an antenna connector to be coupled thereto.

Because there are two separate contact points (the antenna plug 33 and the ground plug 35) available in the antenna connection according to the present invention, the antenna connector 30 is not able to turn when it has been installed in a data card 50 (FIG. 5). Thus, the antenna connector 30 stays firmly in place and provides a reliable contact for both the antenna signal 32A and the ground contact 32B from the data card 50 to the external antenna 31. An antenna connection utilising the two separate plugs 33 and 35, according to the present invention, further enables an antenna module 40 (shown in FIG. 4) which can be turned in relation to the data card 50, to be coupled to the same antenna connection.

The antenna module 40 can be implemented in many different ways. FIG. 4 shows one preferred implementation of the antenna module 40. It is approximately 54 millimeters long (Reference 41), i.e., having substantially the same width as the PCMCIA data card 50 (FIG. 5). This provides for an easy installation of the antenna module 40 in connection with the PCMCIA card 50. The installation is carried out by means of an antenna plug 43 corresponding to the antenna plug 33 shown in FIG. 3. The antenna module 40 does not require a separate ground contact and, therefore, there is no need for a connection plug like the ground plug 35 shown in FIG. 3. Hence, it is possible to turn the antenna module in different directions supported by the antenna plug 43. The length of the antenna module 40 can be implemented in such a small space, e.g., by implementing a radiating antenna conductor 42 having a helix construction (spiral in shape).

FIG. 5 shows the PCMCIA card 50 according to the present invention, the card being equipped with an antenna connection according to the invention. To clarify the technical implementation, a base plate 58, containing the electric components of the PCMCIA card 50, is shown in FIG. 5 as a separate item. The antenna connection of the PCMCIA card 50 consists of a separate antenna socket 51 and a separate ground socket 52. The antenna module 40 is coupled to the PCMCIA card according to the present invention by installing the antenna plug 43 of the antenna module 40 in the antenna socket 51 (the first contact). An electric contact from the antenna plug 43 to the base plate 58 of the PCMCIA data card 50 and further to radio components (not shown in the figure) is implemented by means of an antenna contact 55. Instead of the structure shown in FIG. 5 this antenna contact 55 can made very small (almost flat) by just having a flat plate with e.g. four feet for connecting to the PCB (at four solder points) and where one foot is longer extending and bending upward after the solder point with the PCB to make a spring contact for connecting with the antenna plug 33, 43. Because there is only one fixing point between the antenna 40 and the card 50, the antenna 40 can be turned to different positions in relation to the PCMCIA card 50. Typically, it is turned to an upright position when the radio module is used in order to achieve a higher quality radio connection. If the PCMCIA card 50 is not in use or it has been detached from the computer, the antenna module 40 can preferably be turned in the direction of the PCMCIA card. In this case, the antenna module 40 takes a minimum of space and it is easy to carry the PCMCIA card, e.g., in the pocket. If required, the PCMCIA card 50 can be equipped with a protrusion 53 and the antenna module 40 with a slot 54 by means of which the antenna module 40 can be locked so as to better stay in the direction of the top of the PCMCIA card 50. If the PCMCIA data card 50, according to present invention, is used to establish radio communication in good field conditions, it is not necessary even to turn the radio module 40 to an upright position but, instead, it can be turned in the direction of the PCMCIA card 50.

When, instead of the antenna module 40, the external antenna 31 (FIG. 3) is used in the data card 50, according to the present invention, the antenna module 40 is detached from the antenna socket 51 (the first contact pin). The antenna connector 30, shown in FIG. 3, is coupled in its place, the antenna connector comprising both the antenna plug 33 (the third contact) and the separate ground plug 35 (the fourth contact) according to the invention. In this case, the antenna plug 33 is coupled to the antenna socket 51 (the first contact) and the ground plug 35 to the ground socket 52 (the second contact), correspondingly. Accordingly what is understood as a contact can be in the form of a pin, plug or socket, i.e. male contact or a female contact. An electric contact from the antenna plug 33 to the radio components, located on the PCMCIA card base plate 58, is established by means of a method known in connection with the antenna module 40, i.e., by using the antenna contact 55. Instead, now the ground potential of the PCMCIA card 50 is also coupled, as shown in FIG. 3, to the shield 32B of the coaxial cable 32. Electric coupling is implemented through the ground plug 35 and the ground contact 56 in a manner characteristic of the invention.

Figure 6:
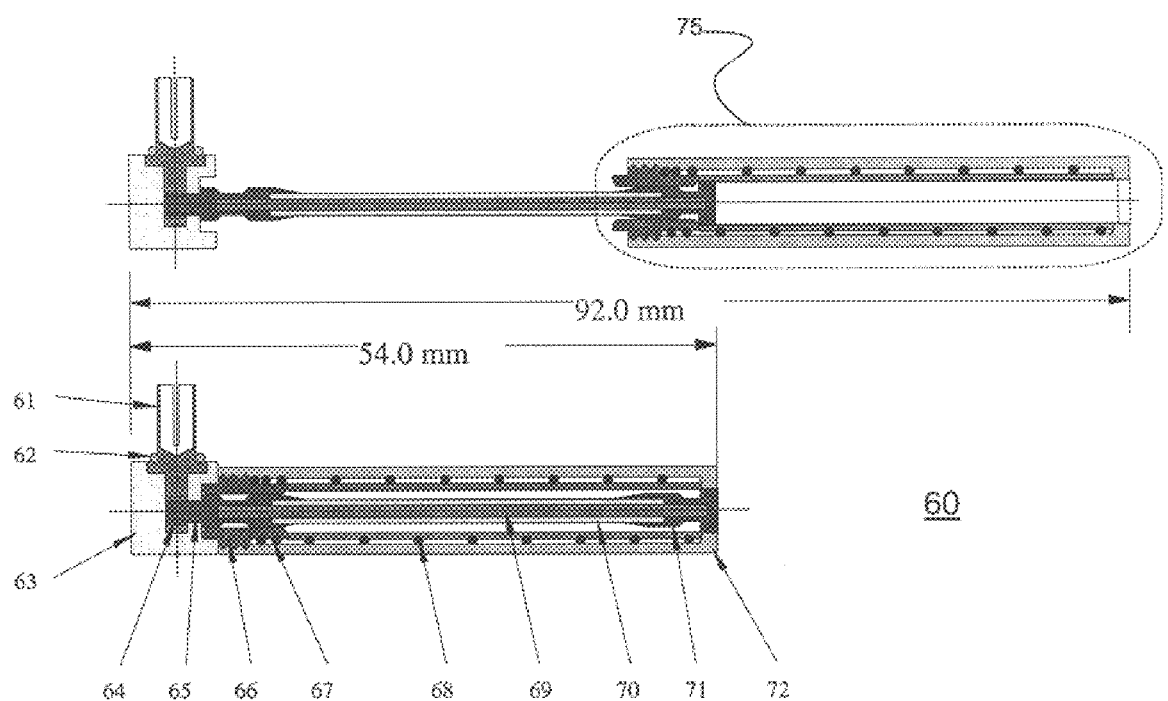
FIG. 6 shows one alternative implementation of an antenna module according to the present invention.

FIG. 6 shows another implementation of the antenna module 40. It can be coupled to the PCMCIA card 50 by means of an antenna plug 61 similar to the antenna plugs 33 and 43. When installing an antenna module 60, shown in FIG. 6, in the antenna socket 51, an insulating O ring 62 remains between the antenna plug 61 and the antenna socket 51. It has been made, e.g., of silicon rubber. When the antenna module 60 is turned to an upright position, the O ring 62 functions as an insulator and it also prevents dirt from collecting on the contact surfaces of the antenna plug 61 and the antenna socket 51. A cover 63 protects both a contact connection 64 and an extension 65, on which a helix element 75 rests, when the antenna is in a retracted position. The top layer of the helix element 75 has a protective element 72. When the antenna is in a retracted position, an antenna signal is transmitted from a spring-like helix element 68 that functions as an antenna through a contact surface 67 and a control unit 66 to the extension 65 and further to the PCMCIA card 50.

When the helix element 75 is withdrawn, it slides for a few centimeters, e.g., three to five centimeters, supported by a conductor element 69. When sliding, the helix element 75 and the conductor element are insulated from one another by an insulating bushing 70. When the helix element 75 has been fully withdrawn, the helix element 68, which functions as an antenna, is coupled through a contact surface 71 to the conductor element 69 to 10 produce a longer antenna with excellent radiation properties. This telescopic-helix-antenna (antenna module 60) can be installed, like the antenna module 40, crosswise at the top of the PCMCIA card 50 (when retracted, its length is substantially 54 mm), wherefrom it can be turned to an upright position and drawn long.

Figure 7:
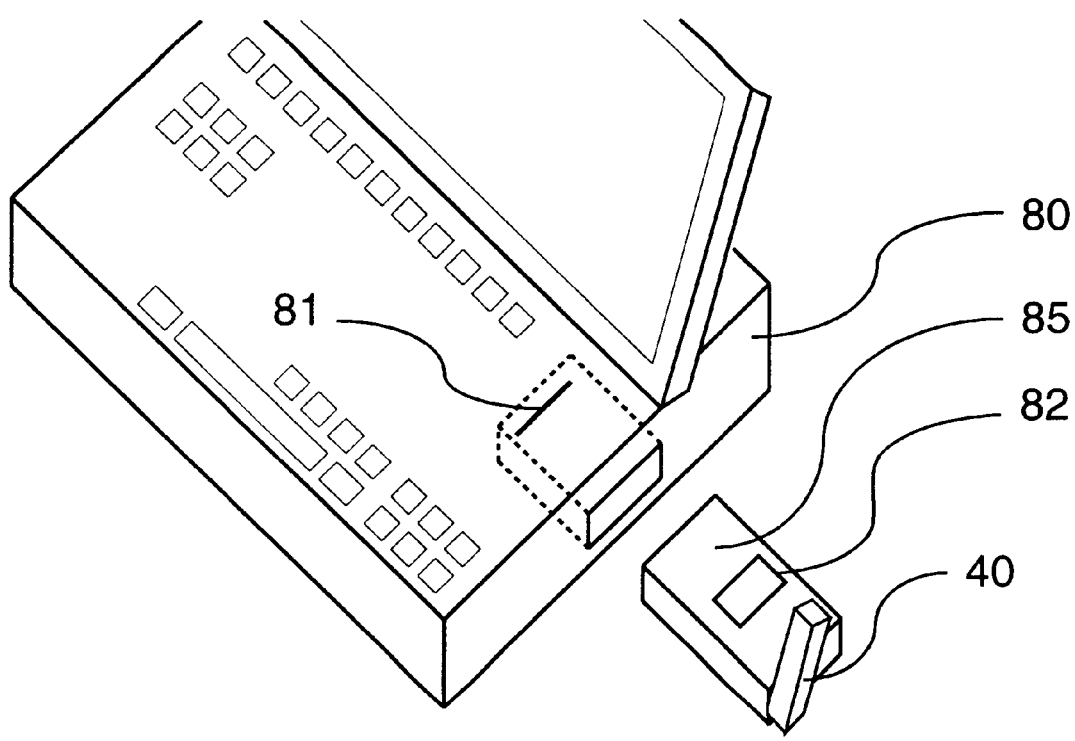
FIG. 7 shows a mobile station module, implemented in a data card according to the present invention, and a portable computer.

Thus, by means of the invention presented above, it is possible to solve the problem of how to implement a reliable, durable and well-radiating antenna solution in connection with a small communication unit or data card. The same connection is preferably also directly suitable for coupling an external antenna. The system according to the present invention is also simple and, thus, economical to implement particularly in connection with PCMCIA modules that utilise radio communication and are manufactured in large series. One of the most important applications relates to the system shown in FIG. 7, wherein the functions of a mobile station have been implemented in connection with a portable computer 80 using a PCMCIA mobile station module 85 comprising radio transmission and reception means 82 according to the present invention. In this exemplary case, the mobile station module 85 is equipped with the antenna module 40, shown in FIG. 4. The mobile station module 85 is installed in a PCMCIA bus 81 of the computer 80.

The paper presented the implementation and embodiments of the invention with the help of examples. It is obvious to a person skilled in the art that the present invention is not restricted to details of the embodiments presented above, and that the invention can also be implemented in another form without deviating from the characteristics of the invention. Thus, the embodiments presented should be considered illustrative but not restricting. Consequently, the various options of the implementation of the invention as determined by the claims, including the equivalent implementations, also belong to the scope of the invention.

What is claimed is:

1. A communication unit comprising a radio module, and antenna connecting means for connecting an antenna to said radio module, in a first mode, the antenna being one carried by the unit and in a second mode, the antenna being an external antenna, said antenna connecting means comprising a first contact to make a connection to enable transmission of an antenna signal between said radio module and said antenna, wherein said antenna connecting means comprises a second contact for providing a ground potential of the radio module to said external antenna, said second contact being at a distance (d3) from said first contact so that the first and second contacts form two opposed contacts.

2. A communication unit comprising a radio module, and antenna connecting means for connecting an antenna to said radio module, in a first mode, the antenna being one carried by the unit and in a second mode, the antenna being an external antenna, said antenna connecting means comprising a first contact to make a connection to enable transmission of an antenna signal between said radio module and said antenna, wherein said antenna connecting means comprises a second contact for providing a ground potential of the radio module to said external antenna, said second contact being at a distance (d3) from said first contact so that the first and second contacts form two opposed contacts, said communication unit further comprising a separate external antenna, the unit and the separate external antenna being coupled together by means of a connector, said connector comprising a third contact and a fourth contact forming two opposed contacts located at said distance (d3) from each other for connecting to said first and second contacts to make a connection to enable transmission of an antenna signal between said radio module and said external antenna and to provide a ground potential for said radio module.

3. The communication unit according to claim 2 wherein it comprises a side for fixing connecting means and that said first contact and said second contact have been placed on said side of the communication unit.

4. The communication unit according to claim 1, wherein it is the size of a PCMCIA data card that can be coupled to a PCMCIA bus.

5. The communication unit according to claim 2 wherein it comprises an antenna module tto be coupled to said first contact and which can be turned to different positions.

6. The communication unit according to claim 5, wherein the length of said antenna module is substantially the same as the width of a PCMCIA data card and that when said antenna module is turned in the direction of one end of the radio module, the radio module and the antenna module form a substantially uniform, compact entity having a smooth surface and that said antenna module may be turned upright in a direction out of a plane of the radio module.

7. The communication unit according to claim 5, wherein it comprises clips for locking said antenna module substantially in the direction of said end of the radio module.

8. The communication unit according to claim 5, wherein said antenna module is a helix-type antenna that can be extended.

9. An external antenna for a transceiver unit to replace an antenna carried by the transceiver unit comprising antenna connecting means for connecting the external antenna to the transceiver unit, said antenna connecting means comprising a first contact for connecting an antenna signal between the external antenna and said transceiver unit, wherein said antenna connecting means comprises a second contact for providing a ground potential of said transceiver unit to said external antenna, said second contact is at a distance from said first contact so that the first and second contacts form two opposed contacts.

10. A method for connecting an external antenna to a communication unit to replace an antenna carried by the communication unit comprising the steps of connecting an antenna signal between said external antenna and said communication unit using a first contact pin, providing a ground potential of the communication unit to said external antenna using a second contact pin, and placing said second contact pin at a distance from said first contact pin so that the first and second contact pins form two opposed contact pins.

11. The communication unit according to claim 1 comprising an antenna which is carried by the unit, the unit and the antenna being coupled together by means of a connector said connector comprising a third contact pin for connecting to said first contact pin to make a connection to enable transmission of an antenna signal between the radio module and said antenna.

12. The communication unit according to claim 11 wherein the antenna which is carried by the unit does not have a contact pin to make a ground potential connection to the second contact pin of the unit.

13. A communication unit comprising: a first socket for receiving a first plug of an antenna and a second socket for receiving a second plug of said antenna, said first and second sockets being spaced apart from one another, said first socket being adapted to couple an RF signal between said communication unit and said antenna and said second socket being adapted to couple a ground signal between said communication unit and said antenna.

14. The communication unit of claim 13 further including an antenna carried by said communication unit, said antenna carried by said communication unit having said first plug coupled to said first socket.

15. The communication unit of claim 14 comprising a PCMCIA card having a planar major face, said antenna carried by said communication unit being rotatable as coupled between a first position wherein said antenna carried by said communication unit is positioned in the plane of said major face of said card and a second position wherein said antenna carried by said communication unit is positioned out of the plane of said major face of said card.

16. The communication unit of claim 13 further including an external antenna which is not carried by said communication unit, said external antenna having said first plug coupled to said first socket and said second plug coupled to said second socket.

* * * * *